(12) United States Patent
Castillo et al.

(10) Patent No.: US 9,429,236 B2
(45) Date of Patent: Aug. 30, 2016

(54) SEALING DEVICES HAVING A NON-ELASTOMERIC FIBROUS SEALING MATERIAL AND METHODS OF USING SAME

(75) Inventors: Robert O. Castillo, Stafford, TX (US); Amy L. Farar, Houston, TX (US); Edward T. Wood, Kingwood, TX (US); Jeffrey C. Williams, Cypress, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 1374 days.

(21) Appl. No.: 12/927,455

(22) Filed: Nov. 16, 2010

(65) Prior Publication Data

US 2012/0119445 A1    May 17, 2012

(51) Int. Cl.
*E21B 33/10* (2006.01)
*F16J 15/12* (2006.01)
*E21B 33/12* (2006.01)

(52) U.S. Cl.
CPC .......... *F16J 15/126* (2013.01); *E21B 33/1208* (2013.01)

(58) Field of Classification Search
CPC ........... E21B 33/1208; E21B 33/1212; E21B 33/1216; F16J 15/126
USPC ................................ 277/322, 329, 339, 341
See application file for complete search history.

(56) References Cited

U.S. PATENT DOCUMENTS

| | | | |
|---|---|---|---|
| 2,289,164 A | 7/1942 | Arnold et al. | |
| 2,330,425 A | 9/1943 | Hilton | |
| 2,467,822 A | 4/1949 | Griffin et al. | |
| 2,604,946 A | 7/1952 | Sweet | |
| 2,789,004 A | 4/1957 | Foster | |
| 2,812,025 A | 11/1957 | Teague et al. | |
| 3,952,656 A | 4/1976 | Fox et al. | |
| 4,258,926 A * | 3/1981 | Upton | 277/340 |
| 4,488,740 A | 12/1984 | Baugh | |

(Continued)

FOREIGN PATENT DOCUMENTS

WO      WO 95/23908      9/1995

OTHER PUBLICATIONS

J.D. Burley, et al., Recent Developments in Packer Seal Systems for Sour Oil and Gas Wells, Oct. 9-12, 1977, pp. 1-8, SPE 6762, American Institute of Mining, Metallurgical, and Petroleum Engineers, Inc., U.S.A.

(Continued)

*Primary Examiner* — Gilbert Lee
(74) *Attorney, Agent, or Firm* — Shawn Hunter

(57) ABSTRACT

Sealing devices such as packers comprise a sealing element having one or more non-elastomeric fibrous sealing material layers formed by a plurality of fibers. The plurality of fibers may comprise one or more of natural material, metallic material, plastic material, or other non-elastomeric sealing material. The non-elastomeric fibrous sealing material layers may be formed by weaving the plurality of fibers, braiding the plurality of fibers, or forming a fibrous mass of the plurality of fibers. During operation, the non-elastomeric fibrous sealing material layers are radially expanded causing compression of the non-elastomeric fibrous sealing material layers. As a result, at least a portion of the air volume within the non-elastomeric fibrous sealing material layers is displaced by non-elastomeric fibrous sealing material causing the sealing element to engage a sealing surface, thereby forming a seal.

25 Claims, 4 Drawing Sheets

(56) References Cited

U.S. PATENT DOCUMENTS

| | | |
|---|---|---|
| 4,615,544 A | 10/1986 | Baugh |
| 4,793,424 A | 12/1988 | Lim, Jr. |
| 5,193,616 A | 3/1993 | Hynes |
| 5,203,412 A | 4/1993 | Doggett |
| 5,327,962 A | 7/1994 | Head |
| 5,343,963 A | 9/1994 | Bouldin et al. |
| 5,466,537 A | 11/1995 | Diede et al. |
| 5,613,557 A | 3/1997 | Blount et al. |
| 5,833,001 A | 11/1998 | Song et al. |
| 5,849,188 A | 12/1998 | Voll et al. |
| 5,849,198 A | 12/1998 | Sharpless |
| 5,936,913 A | 8/1999 | Gill et al. |
| 5,975,205 A | 11/1999 | Carisella |
| 6,006,835 A | 12/1999 | Onan et al. |
| 6,055,213 A | 4/2000 | Rubbo et al. |
| 6,102,117 A | 8/2000 | Swor et al. |
| 6,102,120 A | 8/2000 | Chen et al. |
| 6,173,969 B1 | 1/2001 | Stoll et al. |
| 6,343,796 B1 | 2/2002 | Lee et al. |
| 6,361,049 B1 | 3/2002 | Joco |
| 6,390,479 B1 | 5/2002 | Combet et al. |
| 6,431,273 B1 | 8/2002 | McGarian et al. |
| 6,497,416 B1 | 12/2002 | Morvant |
| 6,571,876 B2 | 6/2003 | Szarka |
| 6,626,243 B1 | 9/2003 | Go Boncan |
| 6,772,844 B2 | 8/2004 | Lloyd et al. |
| 6,843,315 B2 | 1/2005 | Coronado et al. |
| 6,854,522 B2 | 2/2005 | Brezinski et al. |
| 6,962,206 B2 | 11/2005 | Hirth et al. |
| 7,165,622 B2 | 1/2007 | Hirth et al. |
| 7,188,691 B2 | 3/2007 | Yong et al. |
| 7,204,525 B2 | 4/2007 | Matzner |
| 7,210,533 B2 | 5/2007 | Starr et al. |
| 7,213,814 B2 | 5/2007 | Hurlbert et al. |
| 7,331,581 B2 * | 2/2008 | Xu et al. ........................ 277/334 |
| 7,363,970 B2 | 4/2008 | Corre et al. |
| 7,478,679 B2 | 1/2009 | Berzin et al. |
| 7,806,193 B2 | 10/2010 | Berzin et al. |
| 2004/0134659 A1 | 7/2004 | Hoffman et al. |
| 2005/0023003 A1 | 2/2005 | Echols et al. |
| 2006/0186602 A1 | 8/2006 | Martin et al. |
| 2007/0012460 A1 | 1/2007 | Coronado |
| 2007/0039160 A1 | 2/2007 | Turley et al. |
| 2007/0056725 A1* | 3/2007 | Lucas et al. .................. 166/179 |
| 2007/0125532 A1 | 6/2007 | Murray et al. |
| 2007/0144734 A1 | 6/2007 | Xu et al. |
| 2007/0193736 A1 | 8/2007 | Corre et al. |
| 2008/0135260 A1 | 6/2008 | Berzin et al. |
| 2008/0149351 A1 | 6/2008 | Marya et al. |
| 2008/0283236 A1* | 11/2008 | Akers et al. .................. 166/105 |
| 2009/0126947 A1* | 5/2009 | King ............................ 166/387 |
| 2009/0139707 A1 | 6/2009 | Berzin et al. |
| 2009/0211767 A1* | 8/2009 | Nutley et al. ................. 166/378 |
| 2009/0211770 A1* | 8/2009 | Nutley et al. ................. 166/387 |
| 2009/0255675 A1 | 10/2009 | Casciaro |
| 2010/0155050 A1* | 6/2010 | Frazier ......................... 166/102 |
| 2010/0230094 A1 | 9/2010 | Foster et al. |
| 2010/0230902 A1 | 9/2010 | Castillo et al. |

OTHER PUBLICATIONS

D.D. Onan, et al., Elastomeric Composites for Use in Well Cementing Operations, Oct. 3-6, 1993, pp. 593-608, SPE 26572, Society of Petroleum Engineers, Inc., U.S.A.

Thomas W. Ray, High Pressure/High Temperature (HP/HT) Seals for Oil and Gas Production, Feb. 17-19, 1998, pp. 603-614, SPE 39573, Society of Petroleum Engineers, Inc., U.S.A.

Gordon Mackenzie, et al., Wellbore Isolation Intervention Devices Utilizing a Metal-to-Metal Rather Than an Elastomeric Sealing Methodology, Nov. 11-14, 2007, pp. 1-5, SPE 109791, Society of Petroleum Engineers, Inc., U.S.A.

Notification of Transmittal of the International Search Report and the Written Opinion of the International Searching Authority, or the Declaration, May 8, 2012, pp. 1-2, PCT/US2011/059260, Korean Intellectual Property Office.

International Search Report, May 8, 2012, pp. 1-3, PCT/US2011/059260, Korean Intellectual Property Office.

Written Opinion of the International Searching Authority, May 8, 2012, pp. 1-3, PCT/US2011/059260, Korean Intellectual Property Office.

* cited by examiner

SEALING DEVICES HAVING A NON-ELASTOMERIC FIBROUS SEALING MATERIAL AND METHODS OF USING SAME

BACKGROUND

1. Field of Invention

The invention is directed to sealing devices for isolating an annulus of an oil or gas wellbore and, in particular, to sealing devices having a non-elastomeric fibrous sealing material.

2. Description of Art

Packers for sealing wellbores are known in the art. For example, some packers include swellable materials encased within an expandable elastomeric sealing element such as a rubber casing or balloon. These types of packers expand and, thus, seal to the inner wall surface of a wellbore by contacting hydraulic fluid or other fluid with the swellable materials encased within the rubber casing so that the swellable materials absorb the fluid and expand. In one type of these packers, for example, hydraulic fluid is pumped down a string of tubing having the packer secured thereto. The hydraulic fluid travels down the bore of the string of tubing and through a port that is in fluid communication with an inner cavity of the rubber casing. Swellable materials disposed within the rubber casing are contacted by the hydraulic fluid. As a result, the swellable materials absorb the fluid and expand. As the swellable materials expand and hydraulic fluid is pumped into the rubber casing, the rubber casing expands to seal the wellbore. After expansion, hydraulic fluid pressure is decreased and the rubber casing remains held in the expanded position solely by the swellable materials having absorbed the fluid.

Other packers are formed of an elastomeric material that is compressed or otherwise forced into the inner wall surface of the wellbore such as by expanding casing or axially compressing the elastomeric material that is disposed along an outer wall surface of the packer assembly.

SUMMARY OF INVENTION

Broadly, the sealing devices disclosed herein comprise a sealing element that includes at least one non-elastomeric fibrous sealing material. The non-elastomeric fibrous sealing material comprises a plurality of fibers, i.e., two or more fibers. The plurality of fibers may be arranged into a randomly formed "mass" of fibrous materials. Alternatively, or in addition, the plurality of fibers may be formed into a knitted or woven arrangement. Alternatively, or in addition, the plurality of fibers may be formed into a braided arrangement. The plurality of fibers may be formed out of metallic materials, plastic materials such as Mylar™, nylon, or non-elastomeric thermoplastics, or natural materials such as cotton or wool. Although not required, the plurality of fibers may include an elastomeric, polymeric, or other material coated on the plurality of fibers.

By having the sealing element formed of a plurality of fibers, the sealing element will have an initial volume that includes pockets or areas that are voided of fiber, e.g., pockets or areas of air. During operation of the sealing device, the sealing material is compressed causing the volume of the plurality of fibers to be reduced and, therefore, the plurality of fibers to be compressed. During compression, the plurality of fibers are expanded radially outward to engage the inner wall surface of the wellbore to provide a seal within the wellbore.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

Figure 1:
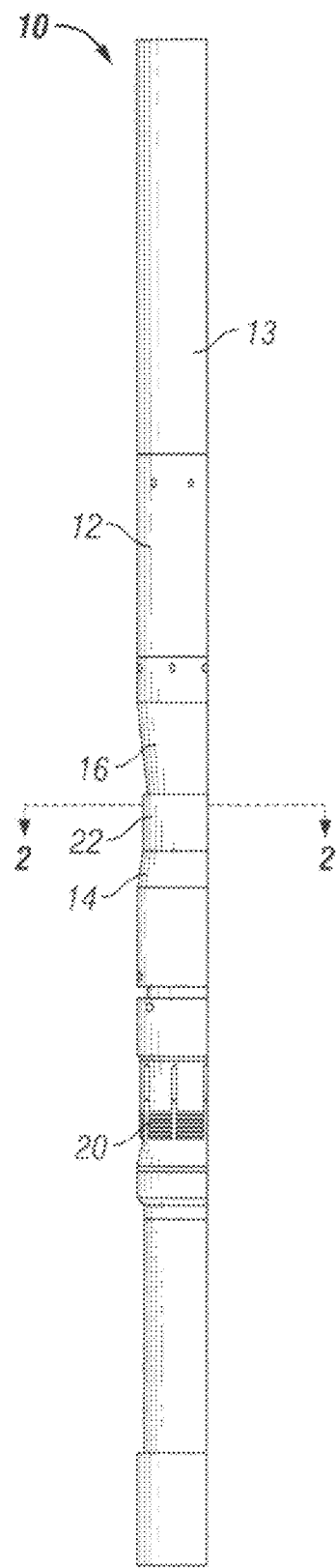
FIG. 1 is a partial cross-sectional view of a packer showing a seal ring disposed on the outer surface of the downhole tool, the seal ring comprising one or more layers of a non-elastomeric fibrous sealing material.
Figure 2:
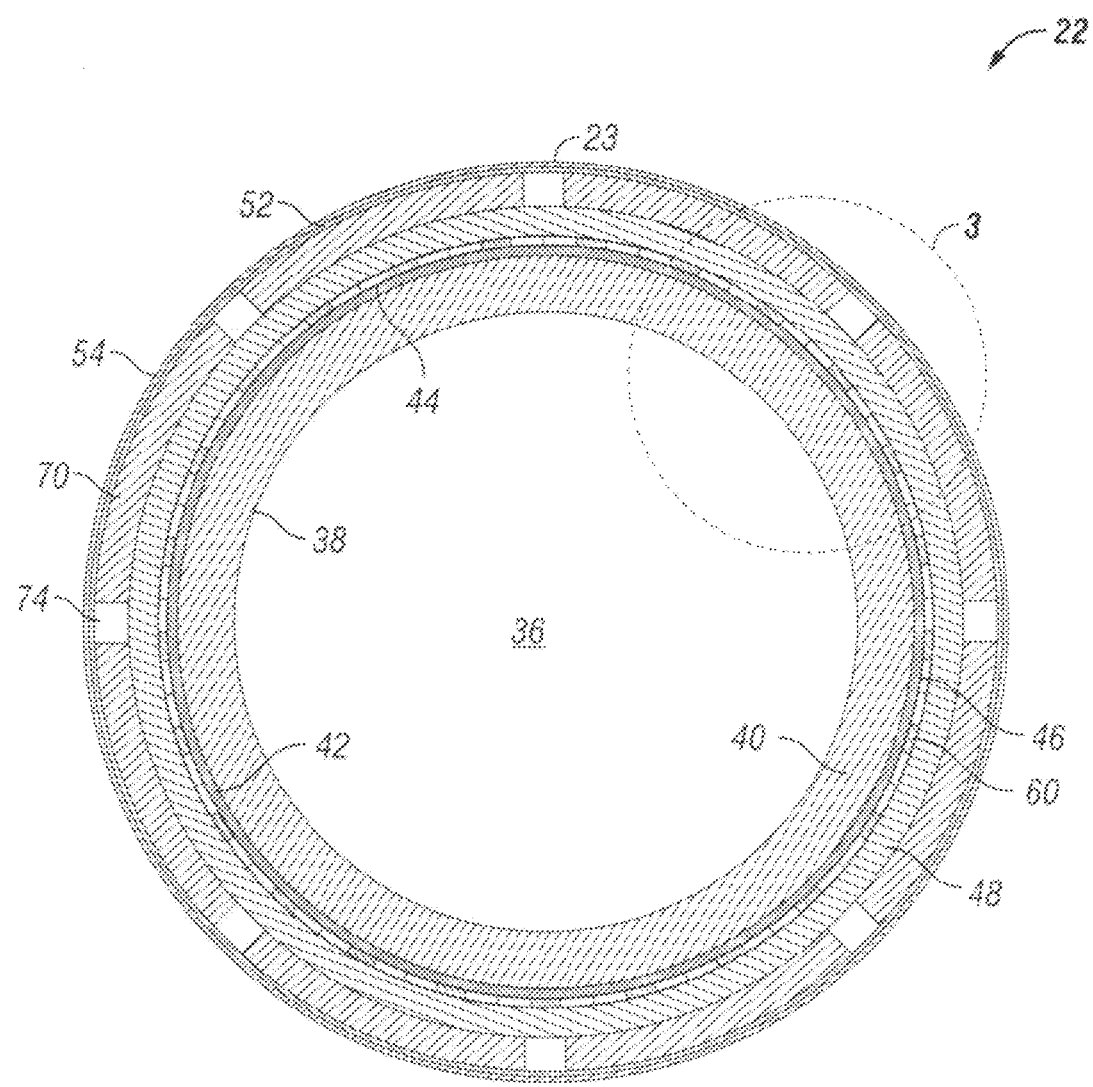
FIG. 2 is a cross-sectional view of the downhole tool of FIG. 1 taken along line 2-2.
Figure 3:
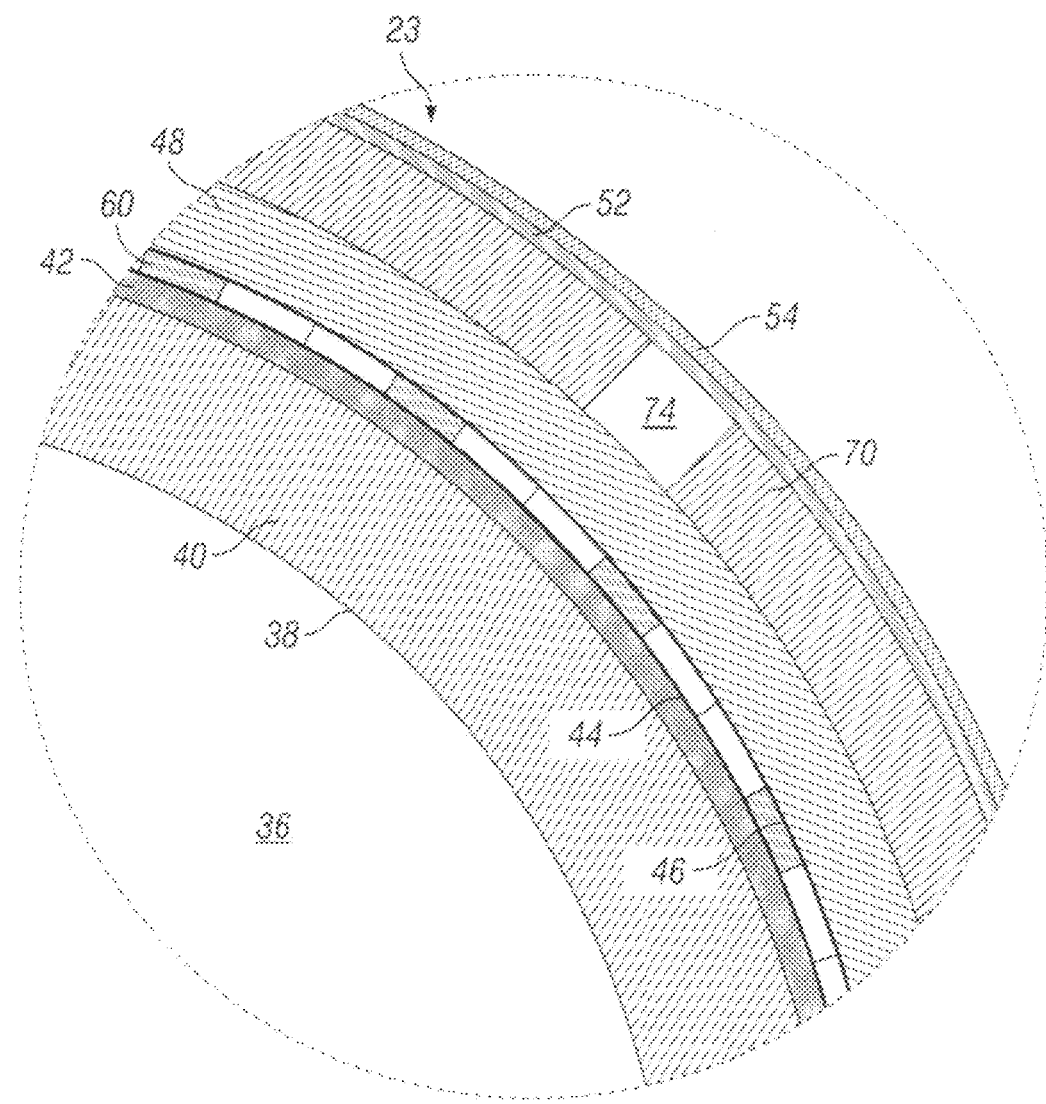
FIG. 3 is a partial cross-sectional view of the sealing ring as shown in FIG. 2 taken along line 3-3.

Referring now to FIG. 1, a downhole tool 10, such as a packer, includes a body or housing 12 having and a sealing member or seal ring 22 disposed on outer surface wall surface 13 of housing 12 for sealing against a surrounding well casing or wellbore hole. Housing 12 is generally cylindrical but may be any shape desired or necessary to form the downhole tool. An actuating member 14 is mounted to housing 12 for axial movement relative to housing 12. In this example, actuating member 14 engages a lower end of seal ring 22 for pushing seal ring 22 upward on a stationary cam surface 16 of housing 12 to cause seal ring 22 to expand radially into the set position. Cam surface 16 is preferably conical. Actuating member 14 may be an annular collet that is radially expansible, or it could be other configurations. In this embodiment, actuating member 14 is secured to a piston (not shown) supplied with hydraulic pressure for moving seal ring 22 relative to cam surface 16.

Tool 10 may be of a conventional design, and actuating member 14 may be moved by a variety of means other than hydraulic pressure, such as employing the weight of the running string (not shown) for tool 10, hydrostatic wellbore pressure, wireline movement, or explosives. Also, although seal ring 22 is shown moving upward onto stationary cam surface 16, the arrangement could be reversed, with seal ring 22 being moved downward. Further, seal ring 22 could be held axially stationary and cam surface 16 be moved relative to seal ring 22. For example, actuating member 14 may actually be held stationary while the running string and housing 12 move downward relative to seal ring 22, pushing seal ring 22 farther onto conical cam surface 16. Alternately, actuating member 14 may move upward relative to seal 22. Regardless of the arrangement of these specific embodiments, seal ring 22 and cam surface 16 move axially relative to each other while being set to deform seal ring 22 radially outward to a larger diameter for engaging an inner wall surface of an outer tubular member (not shown) or wellbore hole (not shown) into which tool 10 is lowered. Outer tubular member may be a string of casing. As shown in FIG.

1, tool 10 in this example also has a set of slips 20 that expand outward and frictionally grip the inner wall surface of the outer tubular member.

As illustrated in FIGS. 2-5, seal ring 22 comprises sealing element 23 comprising one or more layers of sealing materials disposed on central mandrel 40. Central mandrel 40 comprises inner wall surface 38 defining bore 36 and an outer wall surface. Bore 36 is in fluid communication with the bore of a work string (not shown). Although an elastomeric material may be included as one of the layers disposed on central mandrel 40, the one or more layers of sealing materials discussed herein do not include such elastomeric materials, but instead include non-elastomeric fibrous materials. In the embodiment illustrated in FIGS. 2-5, seal element 23 comprises six sealing material layers each comprising a sealing material comprising a plurality of fibers. In addition, the embodiment of FIGS. 2-5 also includes collapsible sleeve 60 and expanding sleeve 70.

Referring to the specific configuration of embodiment of FIGS. 2-5, first sealing material layer 42 is disposed on the outer wall surface of central mandrel 40 and second sealing material layer 44 is disposed on the outer wall surface of first sealing material layer 42. Collapsible sleeve 60 is disposed between second sealing material layer 44 and third sealing material layer 46 such that collapsible sleeve 60 is disposed on the outer wall surface of second sealing material layer 44 and third sealing material layer 46 is disposed on the outer wall surface of collapsible sleeve 60. Fourth sealing material layer 48 is disposed on the outer wall surface of third sealing material layer 46. Expanding sleeve 70 is disposed between fourth sealing material layer 48 and fifth sealing material layer 52 (best shown in FIG. 3) such that expanding sleeve 70 is disposed on the outer wall surface of fourth sealing material layer 48 and fifth sealing material layer 52 is disposed on the outer wall surface of expanding sleeve 70. Sixth sealing material layer 54 is disposed on the outer wall surface of fifth sealing material layer 52.

As indicated above, the sealing materials of sealing material layers 42, 44, 46, 48, 52, 54 comprise a plurality of fibers. As used herein "plurality of fibers" means that the sealing materials comprise two or more fibers, filaments, or strips of non-elastomeric materials. The plurality of fibers may comprise one or more fibers, filaments, or strips of natural materials, metallic materials, plastic materials, and the like, or combinations thereof. In certain embodiments, the plurality of fibers may be arranged in one or more woven patterns, braided patterns, or as loose masses of filaments or fibers. In other words, two or more of the fibers may be woven together such as how fabric is woven. Alternatively, or in addition, two or more fibers may be braided together such as how rope is braided. And, alternatively, or in addition, two or more fibers may be combined randomly together into a fibrous mass resembling, for example, steel wool. In one particular embodiment, fifth sealing material layer 52 and sixth sealing material layer 54 are disposed on seal ring 22 to form continuous encasements.

As discussed above, the plurality of fibers may be formed out of any non-elastomeric material such as natural materials which include cotton, wool, silk, rayon, and the like; metallic materials which include stainless steel and the like; plastic materials which include nylon, non-elastomeric thermoplastics, polyesters, polyester films such as Mylar™, and the like; and/or any other non-elastomeric material.

In the embodiment shown in FIGS. 2-5, first sealing material layer 42 comprises a natural material, second sealing material layer 44 comprises a plastic material, third sealing material layer 46 comprises a plastic material, fourth sealing material layer 48 comprises a fibrous mass material, fifth sealing material layer 52 comprises an aramid material, sixth sealing material layer 54 comprises a metallic material. In one particular embodiment of this arrangement, first sealing material layer 42 and fifth sealing material layer 52 comprise a woven material and sixth sealing material layer 54 comprises a braided metallic material.

Figure 4:
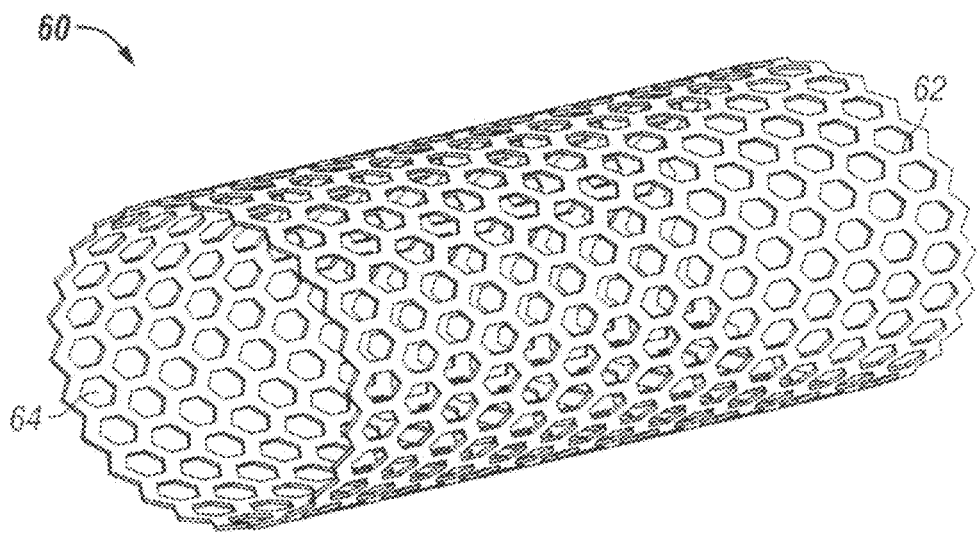
FIG. 4 is a perspective view of a specific embodiment of a progression collapse sleeve of the sealing ring of FIG. 1.

Referring now to FIG. 4, progressive collapsible sleeve 60 comprises a metallic mesh comprising metallic supports 62 forming apertures 64. Although the shapes of metallic supports 62 and, thus, apertures 64 may have any desired or necessary shape and size to facilitate radial expansion of progressive collapsible sleeve 60, as shown in the particular embodiment of FIG. 4, metallic supports 62 provide hexagonally-shaped apertures 64.

Figure 5:
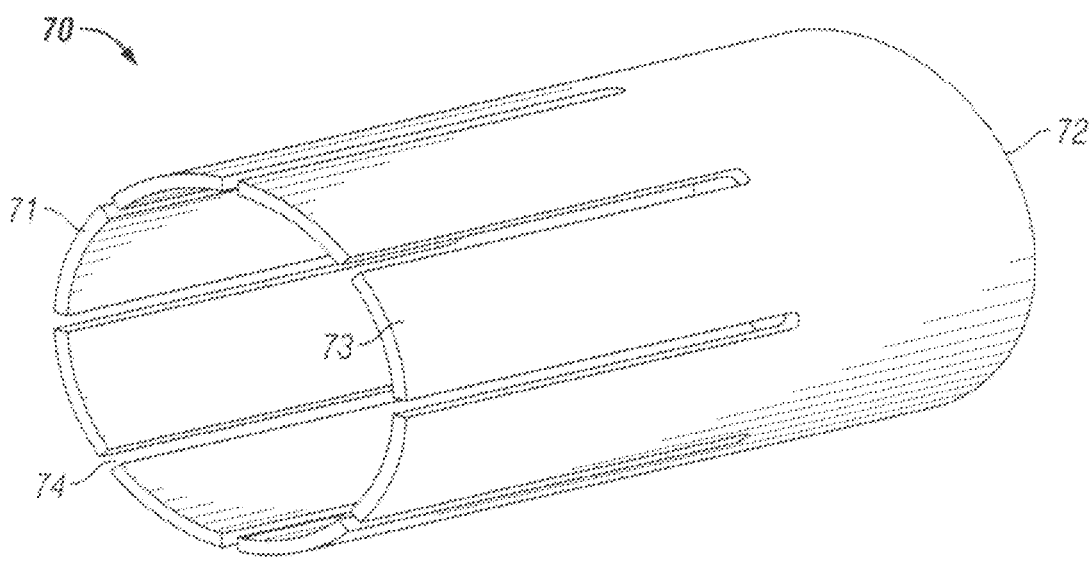
FIG. 5 is a perspective view of a specific embodiment of an expanding sleeve of the sealing ring of FIG. 1.

As illustrated in FIG. 5, expanding sleeve 70 comprises first end 71, second end 72, and tabs 73 formed by slots 74. Slots 74 facilitate radial expansion of expanding sleeve 70 by tabs 73 moving radially outward as first end 71 progresses over cam surface 16 (shown in FIG. 1).

In operation, a downhole tool 10 such as a sealing device or packer comprises a seal ring comprising a sealing element having one or more layers of the non-elastomeric fibrous sealing materials. The downhole tool is placed in a tool sting and lowered into a wellbore to a desired depth. The downhole tool is then actuated, through any method or device known to persons in the art and the seal ring is expanded. During expansion, one or more of the layers of non-elastomeric fibrous sealing materials of the sealing element is expanded radially and compressed. In so doing, the initial volume of the non-elastomeric fibrous sealing materials is reduced by the plurality of fibers taking up the space initially occupied by air between the individual fibers. As a result of the compression of the one or more non-elastomeric fibrous sealing materials, a seal is created between the downhole tool and a sealing surface such as an inner wall surface of casing disposed within the wellbore or the wellbore itself. In certain embodiments, debris within the annulus of the wellbore can be captured by the natural material or fibrous mass to provide, or enhance, the seal created by the downhole tool. In other words, the sealing element functions as a filter prior to the seal being created. This functionality can facilitate the removal of debris from fluid flowing through the annulus of the wellbore such as during flushing operations. In one such embodiment, one or more of the non-elastomeric fibrous sealing material layers comprises a natural material or fibrous mass to facilitate filtering the fluid flowing through the annulus of the wellbore prior to the sealing element forming a seal against the inner wall surface of the wellbore.

It is to be understood that the invention is not limited to the exact details of construction, operation, exact materials, or embodiments shown and described, as modifications and equivalents will be apparent to one skilled in the art. For example, the sealing element may be disposed on an expandable casing or as part of any other sealing device known to persons in the art. Moreover, the number and arrangement of sealing material layers may be altered as desired or necessary to provide the seal. Further, braiding or weaving the sealing materials, or use of a fibrous mass sealing element layer, may be included in as few as none of the sealing material layers or all of the sealing material layers. In addition, the sealing device is not required to be a packer, or a packer as described with respect to FIGS. 1-5. The sealing device may be any other downhole tool that provides a seal between the downhole tool and an inner wall surface of a wellbore. The sealing device may also be part of any other downhole tool that provides compression to create a seal between two surfaces, regardless of whether the seal isolates a wellbore. Moreover, the seal formed by the sealing elements do not have to be leak-proof. The seals only need to sufficiently create a seal so that the desired downhole operation, or completion method, can be run. Further, the progressive collapsible sleeve and the expanding sleeve can be formed out of any desired material. Additionally, the sealing devices disclosed herein can be used in cased wells, as well as open-holed wells, i.e., within the wellbore itself. Accordingly, the invention is therefore to be limited only by the scope of the appended claims.

What is claimed is:

1. A sealing device for use in a wellbore to isolate an annulus of the wellbore, the sealing device comprising:
   a sealing element comprising a non-elastomeric fibrous sealing material disposed on a surface of the sealing device, the non-elastomeric fibrous sealing material comprising a plurality of fibers of non-elastomeric sealing material, the plurality of fibers of non-elastomeric sealing material comprising an initial position in which the plurality of fibers of non-elastomeric sealing material comprises an initial volume and a compressed position in which the initial volume of the plurality of fibers of non-elastomeric sealing material is reduced, wherein the plurality of fibers of non-elastomeric sealing material isolates the annulus of the wellbore when the plurality of fibers of non-elastomeric sealing material is in the compressed position.

2. The sealing device of claim 1, wherein the plurality of fibers comprise a woven sealing material layer.

3. The sealing device of claim 2, wherein the woven sealing material layer comprises a natural material.

4. The sealing device of claim 3, wherein the natural material is selected from the group comprising cotton, wool, silk, rayon, and combinations thereof.

5. The sealing device of claim 2, wherein the woven sealing material layer comprises a plastic material.

6. The sealing device of claim 5, wherein the plastic material is selected from the group consisting of nylon, non-elastomeric thermoplastics, polyesters, polyester films, and combinations thereof.

7. The sealing device of claim 2, wherein the woven sealing material layer comprises a metallic material.

8. The sealing device of claim 7, wherein the metallic material comprises stainless steel.

9. The sealing device of claim 1, wherein the plurality of fibers comprise a braided sealing material layer.

10. The sealing device of claim 9, wherein the braided sealing material layer comprises a natural material.

11. The sealing device of claim 10, wherein the natural material is selected from the group comprising cotton, wool, silk, rayon, and combinations thereof.

12. The sealing device of claim 9, wherein the braided sealing material layer comprises a plastic material.

13. The sealing device of claim 12, wherein the plastic material is selected from the group consisting of nylon, non-elastomeric thermoplastics, polyesters, polyester films, and combinations thereof.

14. The sealing device of claim 9, wherein the braided sealing material layer comprises a metallic material.

15. The sealing device of claim 14, wherein the metallic material comprises stainless steel.

16. The sealing device of claim 1, wherein the plurality of fibers comprise a fibrous mass sealing material layer.

17. The sealing device of claim 16, wherein the fibrous mass sealing material layer comprises a natural material.

18. The sealing device of claim 17, wherein the natural material is selected from the group comprising cotton, wool, silk, rayon, and combinations thereof.

19. The sealing device of claim 16, wherein the fibrous mass sealing material layer comprises a plastic material.

20. The sealing device of claim 19, wherein the plastic material is selected from the group consisting of nylon, non-elastomeric thermoplastics, polyesters, polyester films, and combinations thereof.

21. The sealing device of claim 16, wherein the fibrous mass sealing material layer comprises a metallic material.

22. The sealing device of claim 21, wherein the metallic material comprises stainless steel.

23. The sealing device of claim 1, wherein the plurality of fibers comprise
   a first sealing material layer comprising a woven sealing material layer,
   a second sealing material layer comprising a braided sealing material layer, and
   a third sealing material layer comprising a fibrous mass sealing material layer.

24. A method of forming a seal between a sealing device and a sealing surface, the method comprising the steps of:
   (a) contacting a sealing device with a sealing surface, the sealing device comprising a layer of non-elastomeric sealing material comprising a plurality of fibers disposed on a surface of the sealing device, the plurality of fibers comprising an initial position in which the plurality of fibers comprises at least one voided volume lacking the fibers thereby providing an initial volume, and a compressed position in which at least one of the at least one voided volumes is reduced by compression of the plurality of fibers; and
   (b) compressing the plurality of fibers into the sealing surface causing the plurality of fibers to move from the initial position to the compressed position, causing a seal to be formed between the non-elastomeric sealing material and the sealing surface.

25. The method of claim 24, wherein prior to forming the seal, a fluid is passed through the plurality of fibers causing the filtering of the fluid by the plurality of fibers.

* * * * *